(No Model.)

R. G. CORNFORTH.
CONE BEARING.

No. 590,034. Patented Sept. 14, 1897.

Witnesses
J. H. Shumway
Lillian D. Kelsey

Robert G. Cornforth
Inventor.
By Attys
Earle Seymour

UNITED STATES PATENT OFFICE.

ROBERT G. CORNFORTH, OF SEYMOUR, CONNECTICUT, ASSIGNOR OF ONE-HALF TO FRANK H. BEECHER, OF SAME PLACE.

CONE-BEARING.

SPECIFICATION forming part of Letters Patent No. 590,034, dated September 14, 1897.

Application filed May 29, 1897. Serial No. 638,725. (No model.)

*To all whom it may concern:*

Be it known that I, ROBERT G. CORNFORTH, of Seymour, in the county of New Haven and State of Connecticut, have invented a new Improvement in Cone-Bearings; and I do hereby declare the following, when taken in connection with the accompanying drawings and the letters of reference marked thereon, to be a full, clear, and exact description of the same, and which said drawings constitute part of this specification, and represent, in—

Figure 1:
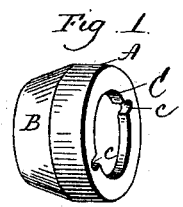
Figure 2:
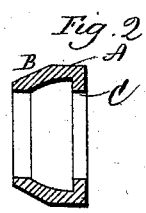
Figure 3:
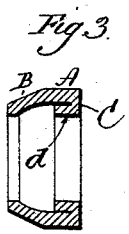
Figure 4:
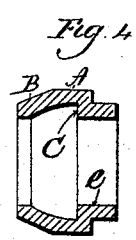

Figure 1, a perspective view of a bearing constructed in accordance with my invention; Fig. 2, a sectional view of the same; Figs. 3 and 4, sectional views of modified forms.

This invention relates to an improvement in cone-bearings such as are employed at the pedals and wheel-hubs of cycles and which comprise a beveled or conical portion projecting from an annular body, through which is an opening corresponding to the axle or spindle upon which it is mounted, and which openings are either threaded for engagement with the threads on the spindle or axle or notched to receive a spline or key, whereby the bearing is locked in position. As usually constructed these bearings are formed from a steel rod turned and bored to proper form or cast, and difficulty is experienced in properly hardening them to withstand the necessary wear.

The object of this invention is to form the bearings from sheet-steel, whereby a bearing of sufficient strength will be produced, and also one much lighter than as usually formed and one which may be readily and equally hardened throughout; and it consists in the construction as hereinafter described, and particularly recited in the claims.

The bearing is formed from a disk of sheet metal and comprises an annular body A and a beveled or tapered end B, corresponding in form substantially to the usual form of cone-bearings. At the outer end of the body the metal is turned in to form a flange C, which forms a support for that end of the bearing, while the internal surface of the conical end is parallel with the inner edge of the flange, so as to properly support the conical end of the bearing, these surfaces being brought into line during the drawing operation necessary in forming the bearing. The flange is preferably formed with a notch $c$ on opposite sides, whereby it may be keyed to a shaft or spindle.

If it is desired to thread the interior of the bearing, whereby it may be adjusted on the threaded shaft or spindle, it will be desirable to increase the interior surface, which may be threaded, and this may be done by forming the flange with a lip $d$, which extends into the bearing to increase the internal surface thereof, or the lip $e$ may extend outward from the flange, as seen in Fig. 4. In either construction the complete bearing is readily drawn from sheet metal and the interior or exterior surface finished by drawing-dies, except in case of threading, which is performed in the usual manner. It will thus be seen that the bearings are formed at much less cost than when formed from steel rods or cast, are much lighter, and equally as strong.

I am aware that bearings for cycles, &c., have been made from sheet metal, and therefore do not wish to be understood as claiming, broadly, such as my invention; but, Having fully described my invention, what I claim as new, and desire to secure by Letters Patent, is—

1. The herein-described cone-bearing for cycles, made from sheet metal and comprising an annular body and a conical end tapering inward from one edge of said body, and a flange extending inward at right angles from the opposite edge of said body, substantially as described.

2. The herein-described cone-bearing for cycles, formed from sheet metal, comprising an annular body and a conical end, said body formed at its inner end with a flange turned inward at right angles thereto, and a lip projecting at right angles to said flange and parallel with said body, the internal surface of said lip corresponding in diameter to the diameter of the opening through the conical end, substantially as described.

In testimony whereof I have signed this specification in the presence of two subscribing witnesses.

ROBERT G. CORNFORTH.

Witnesses:
 FOWLER W. ADAMS,
 HENRY J. CARRIER.